US009389719B2

(12) United States Patent
Li

(10) Patent No.: US 9,389,719 B2
(45) Date of Patent: Jul. 12, 2016

(54) TOUCH SCREEN, METHOD FOR MANUFACTURING THE SAME, 3D DISPLAY APPARATUS

(71) Applicants: BOE Technology Group Co., Ltd., Beijing (CN); Chengdu BOE Optoelectronics Technology Co., Ltd., Chengdu (CN)

(72) Inventor: Fan Li, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 88 days.

(21) Appl. No.: 14/311,895

(22) Filed: Jun. 23, 2014

(65) Prior Publication Data
US 2015/0277639 A1 Oct. 1, 2015

(30) Foreign Application Priority Data
Mar. 25, 2014 (CN) .......................... 2014 1 0114873

(51) Int. Cl.
*G06F 3/041* (2006.01)
*G02B 27/22* (2006.01)
*G06F 3/044* (2006.01)

(52) U.S. Cl.
CPC .......... *G06F 3/0412* (2013.01); *G02B 27/2214* (2013.01); *G06F 3/044* (2013.01); *G06F 3/0416* (2013.01); *G06F 2203/04103* (2013.01); *G06F 2203/04111* (2013.01)

(58) Field of Classification Search
CPC .. G02B 27/2214; G06F 3/0412; G06F 3/0416
USPC .......................................................... 345/173
See application file for complete search history.

(56) References Cited

U.S. PATENT DOCUMENTS

| 2011/0012845 A1* | 1/2011 | Rothkopf | G06F 3/044 345/173 |
| 2012/0062248 A1* | 3/2012 | Lee | G06F 3/044 324/679 |

(Continued)

FOREIGN PATENT DOCUMENTS

| CN | 102707514 A | 10/2012 |
| CN | 103049156 A | 4/2013 |

(Continued)

OTHER PUBLICATIONS first Office Action, including Search Report, for Chinese Patent Application No. 201410114873.5, dated Apr. 28, 2016, 16 pages.

*Primary Examiner* — Viet Pham
(74) *Attorney, Agent, or Firm* — Westman, Champlin & Koehler, P.A.

(57) ABSTRACT

A touch screen having a touch control electrode, wherein the touch control electrode comprises: a first electrode unit having a first strip body and a first teeth-like structure perpendicular to the first strip body and extending from a side of the first strip body; and a second electrode unit having a second strip body and a second teeth-like structure perpendicular to the second strip body and extending from a side of the second strip body. The first teeth-like structure of the first electrode unit and the second teeth-like structure of the second electrode unit are arranged to face each other and spaced away from each other. The first teeth-like structure of the first electrode unit and the second teeth-like structure of the second electrode unit are configured to shade light. The present invention also discloses a method for manufacturing the touch screen and a 3D display apparatus.

18 Claims, 9 Drawing Sheets

(56) References Cited

U.S. PATENT DOCUMENTS

| | | | |
|---|---|---|---|
| 2012/0256642 A1* | 10/2012 | Badaye | G06F 3/044 324/658 |
| 2013/0308067 A1* | 11/2013 | Hashimoto | G02B 27/2214 349/15 |
| 2014/0063367 A1* | 3/2014 | Yang | G02F 1/1335 349/12 |
| 2014/0168154 A1 | 6/2014 | Wang et al. | |
| 2014/0184943 A1 | 7/2014 | Yang et al. | |
| 2014/0210784 A1* | 7/2014 | Gourevitch | H03K 17/962 345/174 |
| 2014/0354301 A1* | 12/2014 | Trend | G06F 3/044 324/658 |
| 2015/0277186 A1 | 10/2015 | Zou | |

FOREIGN PATENT DOCUMENTS

| | | |
|---|---|---|
| CN | 103116233 A | 5/2013 |
| CN | 203070262 U | 7/2013 |
| CN | 103257772 A | 8/2013 |
| CN | 103293778 A | 9/2013 |
| CN | 103487971 A | 1/2014 |

\* cited by examiner

TOUCH SCREEN, METHOD FOR MANUFACTURING THE SAME, 3D DISPLAY APPARATUS

CROSS-REFERENCE TO RELATED APPLICATION

This application claims the benefit of Chinese Patent Application No. 201410114873.5 filed on Mar. 25, 2014 in the State Intellectual Property Office of China, the whole disclosure of which is incorporated herein by reference.

BACKGROUND OF THE INVENTION

1. Field of the Invention

The present invention relates to a display technology field, more particularly, relates to a touch screen, a method for manufacturing the touch screen, and a 3D (three dimensional) display apparatus.

2. Description of the Related Art

Improving experience effect of a user is regarded as main technologies tend of a liquid crystal display apparatus. So far, there are two aspects to improve the experience effect of the user. One aspect is to apply a touch screen so that the user can simply and quickly perform various operations in human-computer interaction. The other aspect is to provide a 3D display for the user so as to improve visual effect of the user, preferably, to provide a naked-eye 3D display for the user. The naked-eye 3D display can achieve better visual effect for the user because the user does not need to wear 3D glasses.

Generally, the touch screen comprises a touch control electrode. When the user touches the touch screen, a coupling capacitance is generated between the user and the touch control electrode, and the touch point of the user can be accurately calculated by detecting an output signal variation. FIG. 1 is a principle view of a naked-eye 3D display. As shown in FIG. 1, odd columns of pixels 1' of the naked-eye 3D display are used to display a left eye image, and even columns of pixels 2' of the naked-eye 3D display are used to display a right eye image. A grating 3' is provided in the front of the naked-eye 3D display. The grating 3' comprises light-transmission strips and light-shading strips. If the width of the light-transmission stripes and light-shading stripes and the height of the grating 3' are properly preset, the light-shading stripes of the grating 3' can block the right eye image from the left eye of the user and can block the left eye image from the right eye of the user so as to achieve the 3D display effect.

Accordingly, in the prior art, the grating 3' is produced on the touch screen to achieve the naked-eye 3D display effect of the touch screen, greatly improving the experience effect of the user. However, inventors of the present invention find it is difficult to accurately position the grating 3' relative to the odd columns of pixels 1' and the even columns of pixels 2' of the touch screen. Thereby, during manufacturing the grating 3' on the touch screen, position error of the grating 3' cannot be avoid, decreasing the display effect of the 3D display.

SUMMARY OF THE INVENTION

The present invention has been made to overcome or alleviate at least one aspect of the above mentioned disadvantages.

According to an object of the present invention, there is provided a touch screen, a method for manufacturing the touch screen, and a 3D display apparatus to improve display effect by avoiding position error of a grating the during manufacturing the grating.

According to an aspect of the present invention, there is provided a touch screen having a touch control electrode, wherein the touch control electrode comprising: a first electrode unit having a first strip body and a first teeth-like structure perpendicular to the first strip body and extending from a side of the first strip body; and a second electrode unit having a second strip body and a second teeth-like structure perpendicular to the second strip body and extending from a side of the second strip body. The first teeth-like structure of the first electrode unit and the second teeth-like structure of the second electrode unit are arranged to face each other and spaced away from each other. The first teeth-like structure of the first electrode unit and the second teeth-like structure of the second electrode unit are configured to shade light.

According to another aspect of the present invention, there is provided a 3D display apparatus comprising a touch screen according to any one of the above embodiments.

According to another aspect of the present invention, there is provided a method for manufacturing a touch screen, comprising a step of forming a pattern of a touch control electrode, wherein the touch control electrode comprises a first electrode unit and a second electrode unit, the first electrode unit having a first strip body and a first teeth-like structure perpendicular to the first strip body and extending from a side of the first strip body, and the second electrode unit having a second strip body and a second teeth-like structure perpendicular to the second strip body and extending from a side of the second strip body, wherein the first teeth-like structure of the first electrode unit and the second teeth-like structure of the second electrode unit are arranged to face each other and spaced away from each other, and wherein the first teeth-like structure of the first electrode unit and the second teeth-like structure of the second electrode unit are configured to shade light.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
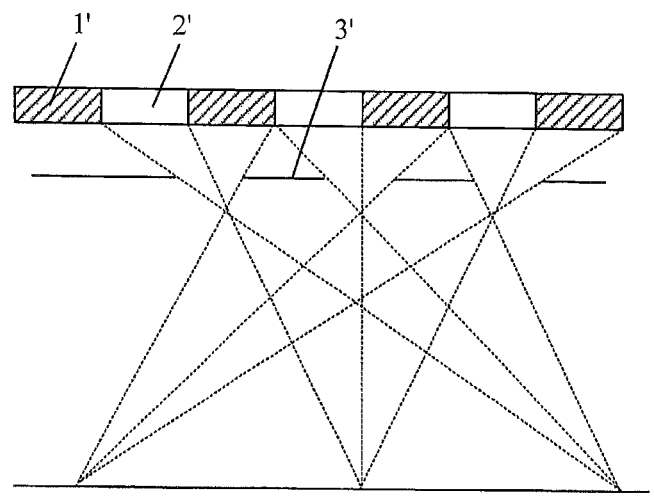
FIG. 1 is an illustrative principle view of a naked-eye 3D display in the prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a touch screen having a touch control electrode, wherein the touch control electrode comprises: a first electrode unit having a first strip body and a first teeth-like structure perpendicular to the first strip body and extending from a side of the first strip body; and a second electrode unit having a second strip body and a second teeth-like structure perpendicular to the second strip body and extending from a side of the second strip body. The first teeth-like structure of the first electrode unit and the second teeth-like structure of the second electrode unit are arranged to face each other and separated from each other. The first teeth-like structure of the first electrode unit and the second teeth-like structure of the second electrode unit are configured to shade light.

Figure 2:
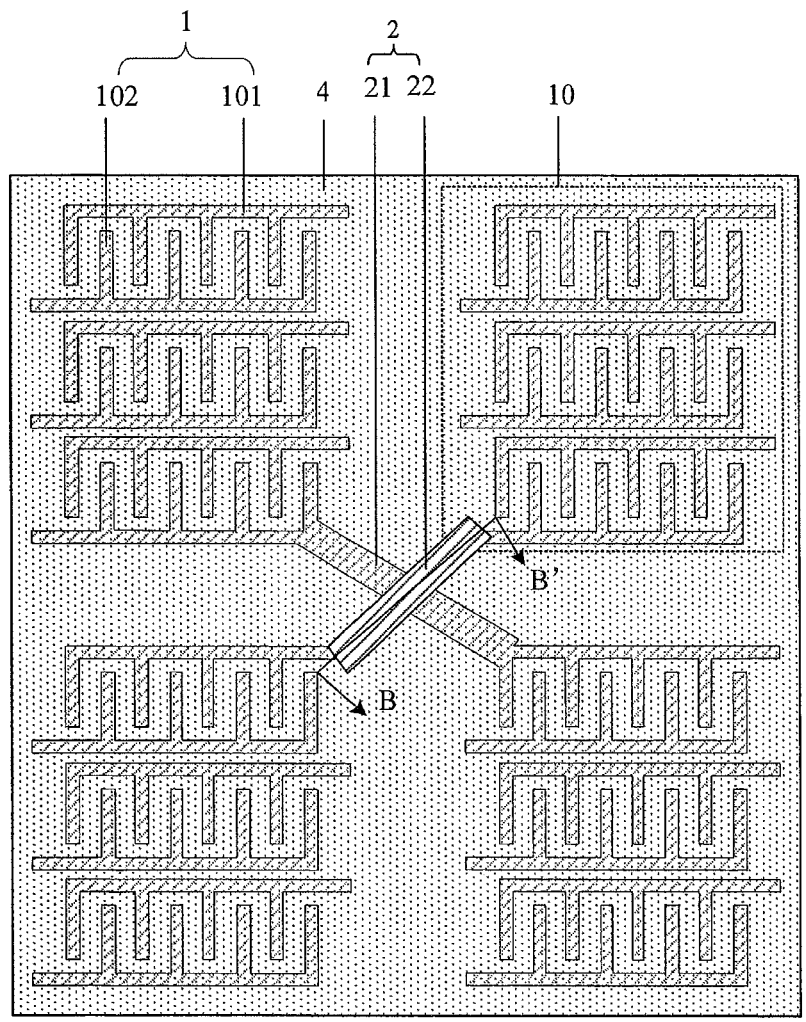
FIG. 2 is an illustrative plan view of a first touch screen according to an exemplary embodiment of the present invention.

As shown in FIG. 2, in an exemplary embodiment, a touch screen comprises a touch control electrode 1. The touch control electrode 1 comprises a first electrode unit 101 and a second electrode unit 102. The first and second electrode units 101, 102 each comprises a strip body and a teeth-like structure perpendicular to the strip body and extending from a side of the strip body. The teeth-like structure of the first electrode unit 101 and the teeth-like structure of the second electrode unit 102 are arranged to face each other and spaced away from each other. The teeth-like structure of the first electrode unit 101 and the teeth-like structure of the second electrode unit 102 are configured to shade or block light.

In an exemplary embodiment of the present invention, the touch control electrode 1 may be made of metal, so that the touch control electrode 1 not only functions as an electrode for conducting electricity, but also as a grating for shading light. In this embodiment, since the touch control electrode 1 comprises the grating for blocking light, it does not need to specially produce an individual grating on the touch screen, thereby saving the production cost, avoiding the position error of manufacturing the individual grating in the prior art, and further improving the 3D display effect.

In the illustrated embodiment of FIG. 2, the first electrode unit 101 comprises a first strip body and a first teeth-like structure perpendicular to the first strip body and extending from a side of the first strip body. The second electrode unit 102 comprises a second strip body and a second teeth-like structure perpendicular to the second strip body and extending from a side of the second strip body. The first teeth-like structure of the first electrode unit 101 and the second teeth-like structure of the second electrode unit 102 are arranged to face each other and spaced away from each other. The first teeth-like structure of the first electrode unit 101 and the second teeth-like structure of the second electrode unit 102 are configured to shade light.

Referring to FIG. 2 again, the first strip body and the second strip body extend in a first direction, and the first teeth-like structure and the second teeth-like structure extend in a second direction perpendicular to the first direction. The first teeth-like structure comprises a plurality of first teeth arranged in the first direction and spaced away from each other, and the second teeth-like structure comprises a plurality of second teeth arranged in the second direction and spaced away from each other.

In an exemplary embodiment of the present invention, the first teeth-like structure of the first electrode unit 101 and the second teeth-like structure of the second electrode unit 102 are arranged to be staggered with each other.

Please be noted that the width of the teeth and the space between adjacent teeth of the first electrode unit 101 and the second electrode unit 102 may be adjusted as necessary. As shown in FIG. 1, in an exemplary embodiment, the width of the teeth and the space between two adjacent teeth may be determined based on a size of a display pixel, a vertical distance of the touch control electrode 1 from the display pixel and a distance of the touch control electrode 1 from eyes of a user. But the present invention is not limited to the illustrated embodiments, the width of the teeth and the space between adjacent teeth may be set as long as the teeth-like structure can just block an image of even columns of pixels from a left eye of a user and can just block an image of odd columns of pixels from a right eye of the user, so that the user can experience a naked-eye 3D display effect without wearing 3D glasses.

In an exemplary embodiment of the present invention, as shown in FIG. 2, the touch control electrode 1 comprises a plurality of electrode sets 10 arranged in an array, and the plurality of electrode sets 10 each comprises the first electrode unit 101 and the second electrode unit 102.

In order to reduce the resistance of the touch control electrode 1, as shown in FIG. 2, in an exemplary embodiment of the present invention, diagonally adjacent electrode sets 10 are connected by a bridge 2, and the bridge 2 comprises a first bridge unit 21 and a second bridge unit 22 crossing over the first bridge 21.

In an exemplary embodiment of the present invention, as shown in FIG. 2, the first bridge unit 21 is configured to electrically connect one pair of diagonally adjacent electrode sets of four adjacent electrode sets 10; and the second bridge unit 22 is electrically configured to connect the other pair of diagonally adjacent electrode sets of four adjacent electrode sets 10.

In an exemplary embodiment of the present invention, the first bridge unit 21, the second bridge unit 22 and the electrode set 10 may be made of the same metal. As a result, the first bridge unit 21, the second bridge unit 22 and the electrode set 10 may be arranged in any one position relation as follows:

(i) the first bridge unit 21 and the electrode sets 10 connected to the first and second bridge units 21 and 22 are arranged in the same layer; or (ii) the first bridge unit 21 and the electrode sets 10 connected to the first bridge unit 21 are arranged in one layer, and the second bridge unit 22 and the electrode sets 10 connected to the second bridge unit 22 are arranged in another layer; or (iii) the second bridge unit 22 and the electrode sets 10 connected to the first and second bridge units 21 and 22 are arranged in the same layer.

Figure 3:
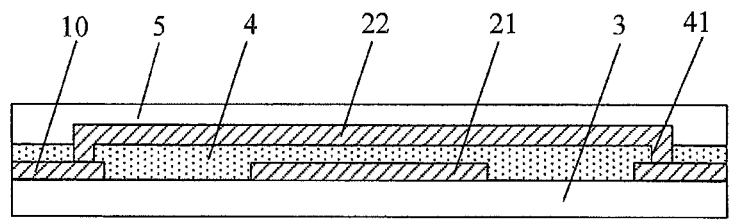
FIG. 3 is an illustrative cross section view of the first touch screen along a line B-B' shown in FIG. 2.

In an exemplary embodiment of the present invention, as shown in FIG. 3, the above touch screen may further comprise a substrate 3, an insulation layer 4 and a protection layer 5. Since the substrate 3 is required to have a good transparency, the substrate 3 may comprise a transparent glass substrate or a transparent quartz substrate, or a transparent glass substrate or a transparent quartz substrate which provided with any other suitable structure. The insulation layer 4 is constructed to electrically isolate the first bridge unit 21 from the second bridge unit 22. The protection layer 5 is constructed to protect the touch control electrode 1, the bridge 2 and other structure parts. The insulation layer 4 and the protection layer 5 are often made of silicon oxide or silicon nitride.

Since the insulation layer 4 is only used to electrically isolate the first bridge unit 21 from the second bridge unit 22, the insulation layer 4 may be formed only at a position where the second bridge unit 22 crosses over the first bridge unit 21. In another exemplary embodiment, the insulation layer 4 may be formed to wholly cover a side of the substrate 3. In this case where the insulation layer 4 wholly covers the side of the substrate 3, vias are formed in the insulation layer 4 to electrically connect the first and second bridge units 21 and 22 and the electrode sets 10.

In an exemplary embodiment of the present invention, as shown in FIG. 3, the first bridge unit 21, the insulation layer 4, the second bridge unit 22 and the protection layer 5 are formed on the side of the substrate 3 in this order.

In an exemplary embodiment of the present invention, the touch screen having the substrate 3, the electrode set 10, the first bridge unit 21, the insulation layer 4, the second bridge unit 22 and the protection layer 5 may be configured in any one of arrangements as follows:

(i) A First Arrangement

As shown in FIGS. 2-3, the first bridge units 21 and the electrode sets 10 (connected to the first and second bridge units 21, 22) arranged in the same layer, the insulation layer 4, the second bridge units 22 and the protection layer 5 are successively formed on one side of the substrate 3. The insulation layer 4 is formed to cover the whole side of the substrate 3. A first via 41, corresponding to the second bridge unit 22 and the electrode sets 10 connected to the second bridge unit 22, is formed in the insulation layer 4. The second bridge unit 22 is electrically connected to the electrode sets 10 through the via 41.

(ii) A Second Arrangement

Figure 4:
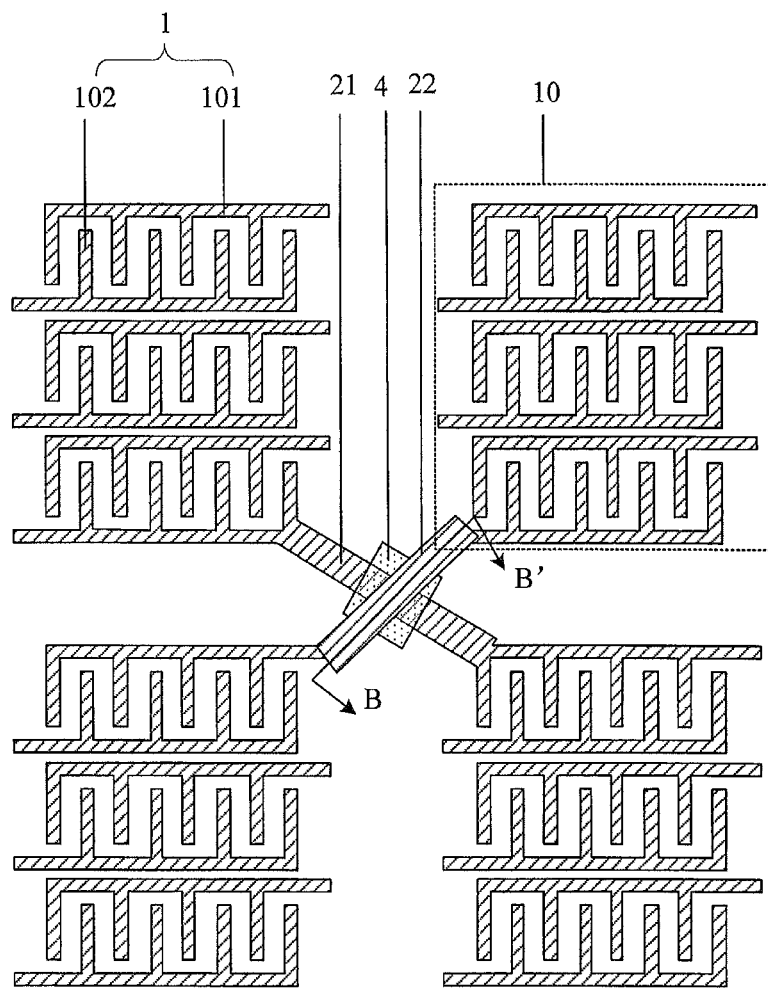
FIG. 4 is an illustrative plan view of a second touch screen according to an exemplary embodiment of the present invention.
Figure 5:
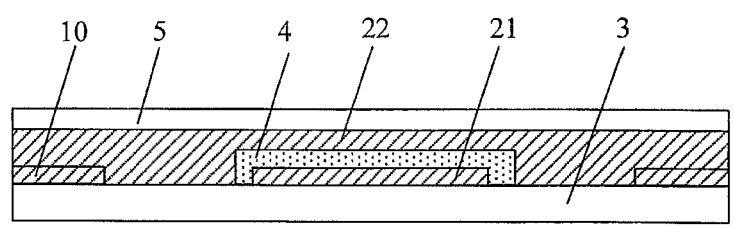
FIG. 5 is an illustrative cross section view of the second touch screen along a line B-B' shown in FIG. 4.

As shown in FIGS. 4-5, the first bridge units 21 and the electrode sets 10 (connected to the first and second bridge units 21, 22) arranged in the same layer, the insulation layer 4, the second bridge units 22 and the protection layer 5 are sequentially formed on one side of the substrate 3. The insulation layer 4 is only formed at a position where the second bridge unit 22 crosses over the first bridge unit 21.

(iii) A Third Arrangement

Figure 6:
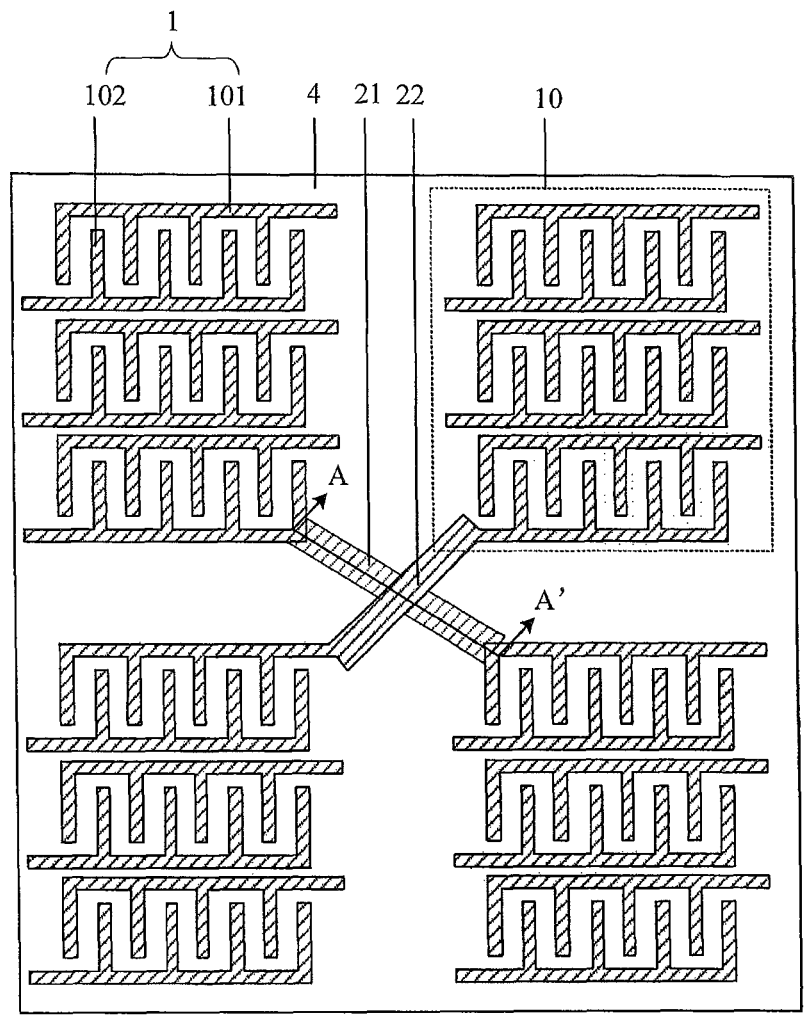
FIG. 6 is an illustrative plan view of a third touch screen according to an exemplary embodiment of the present invention.
Figure 7:
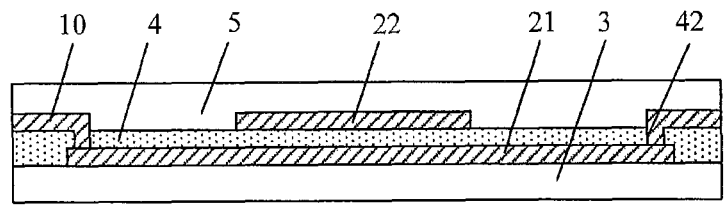
FIG. 7 is an illustrative cross section view of the third touch screen along a line A-A' shown in FIG. 6.

As shown in FIGS. 6-7, the first bridge units 21, the insulation layer 4, the electrode sets 10 (connected to the first and second bridge units 21, 22) and the second bridge units 22 arranged in the same layer, and the protection layer 5 are sequentially formed on one side of the substrate 3. The insulation layer 4 is formed to cover the whole side of the substrate 3. A second via 42, corresponding to the first bridge unit 21 and the electrode sets 10 connected to the first bridge unit 21, is formed in the insulation layer 4. The first bridge unit 21 is electrically connected to the electrode sets 10 through the via 42.

(iv) A Fourth Arrangement

Figure 8:
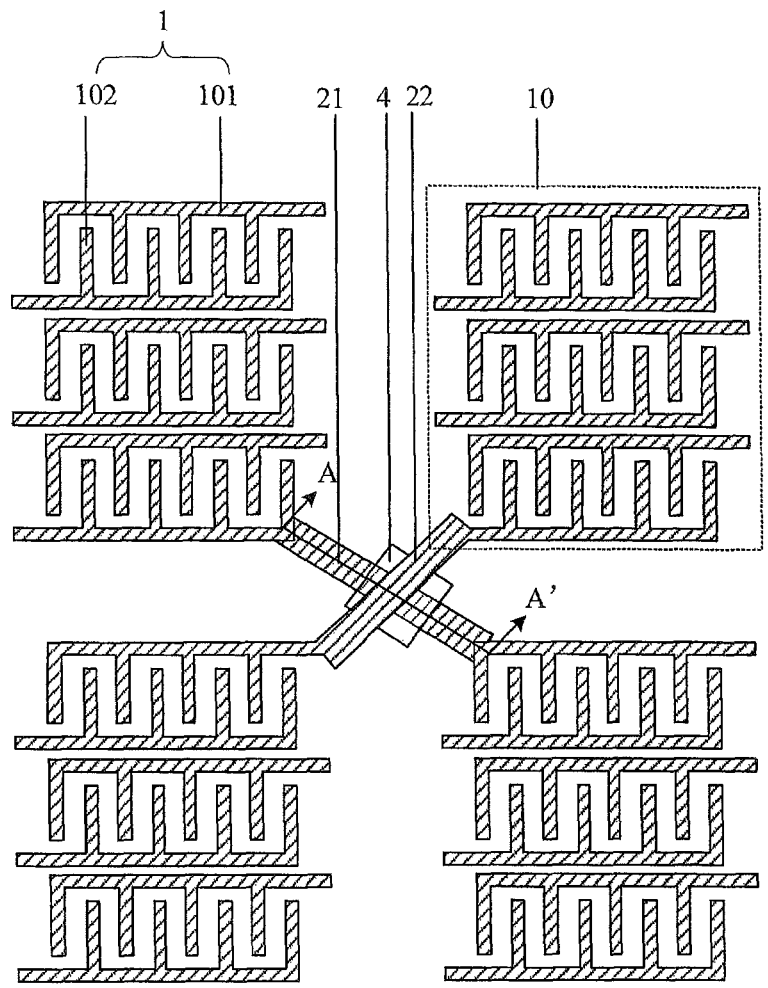
FIG. 8 is an illustrative plan view of a fourth touch screen according to an exemplary embodiment of the present invention.
Figure 9:
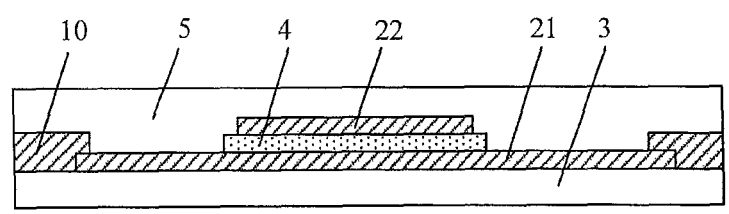
FIG. 9 is an illustrative cross section view of the fourth type of touch screen along a line A-A' shown in FIG. 8.

As shown in FIGS. 8-9, the first bridge units 21, the insulation layer 4, the electrode sets 10 (connected to the first and second bridge units 21, 22) and the second bridge units 22 arranged in the same layer, and the protection layer 5 are sequentially formed on one side of the substrate 3. The insulation layer 4 is only formed at a position where the second bridge unit 22 crosses over the first bridge unit 21.

(v) A Fourth Arrangement

Figure 10:
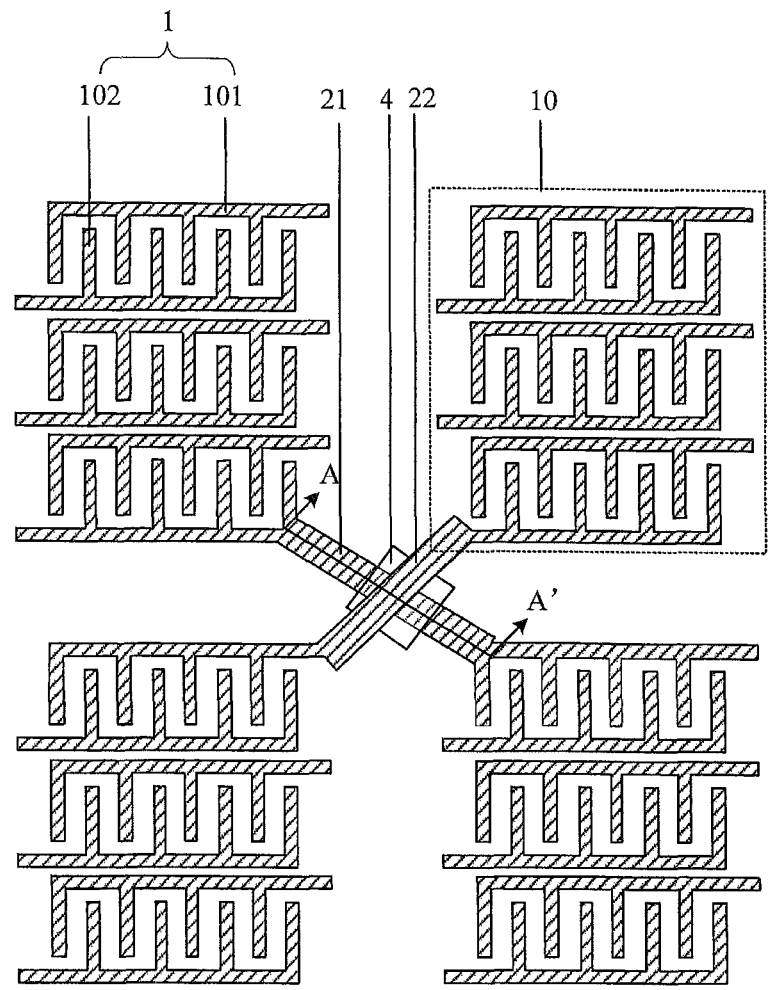
FIG. 10 is an illustrative plan view of a fifth touch screen according to an exemplary embodiment of the present invention.
Figure 11:
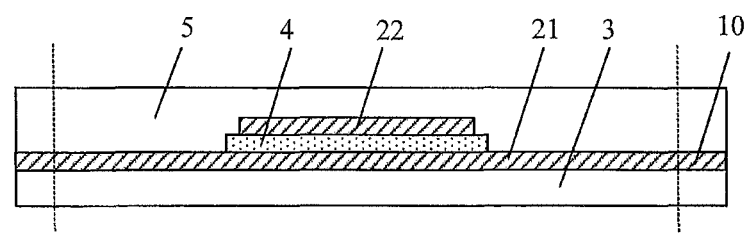
FIG. 11 is an illustrative cross section view of the fifth touch screen along a line A-A' shown in FIG. 10.

As shown in FIGS. 10-11, the first bridge unit 21 and the electrode sets 10 (connected to the first bridge unit 21) arranged in the same layer, the insulation layer 4, the second bridge unit 22 and the electrode sets 10 (connected to the second bridge unit 22) arranged in the same layer, and the protection layer 5 are sequentially formed on one side of the substrate 3. The insulation layer 4 is only formed at a position where the second bridge unit 22 crosses over the first bridge unit 21. Please be noted that a dash line shown in FIG. 11 is not a real cutting line in the actual structure, but an imaginary line only for facilitating the description.

Although several possible arrangements of the touch screen have been described in the above exemplary embodiments, it is obvious for those skilled in this art to think out other arrangements or variations of the touch screen based on the teaching of the above exemplary embodiments of the present invention. For the purpose of concise, other possible arrangements or variations of the touch screen are omitted herein.

In an exemplary embodiment of the present invention, the touch screen may further comprise other structure(s), and the description thereof is also omitted herein.

In the above various embodiments of the present invention, the touch screen comprises the touch control electrode. The touch control electrode comprises a first electrode unit and a second electrode unit. The first electrode unit has a first strip body and a first teeth-like structure perpendicular to the first strip body and extending from a side of the first strip body. The second electrode unit has a second strip body and a second teeth-like structure perpendicular to the second strip body and extending from a side of the second strip body. The first teeth-like structure of the first electrode unit and the second teeth-like structure of the second electrode unit are arranged to face each other and separated from each other. The first teeth-like structure of the first electrode unit and the second teeth-like structure of the second electrode unit are configured to shade light. Thereby, in the present invention, the touch control electrode not only functions as an electrode for conducting electricity, but also as a grating for shading light to achieve the naked-eye 3D display effect. As a result, in the embodiments of the present invention, it does not need to specially produce an individual grating on the touch screen, avoiding the position error of manufacturing the individual grating and improving the 3D display effect.

In an exemplary embodiment of the present invention, there is also provided a 3D display apparatus comprising a color filter substrate and the touch screen according to any one of the above embodiments.

In an exemplary embodiment of the present invention, in order to simplify the structure and manufacturing process of the 3D display apparatus, the touch control electrode 1 is provided on one side of the substrate of the touch screen, and a black matrix and a color filter layer are provided on the other side of the substrate of the touch screen. In this case, the thickness of the substrate is equal to a distance between the touch control electrode 1 and the display pixels.

In another exemplary embodiment of the present invention, the touch control electrode and other necessary members may be formed on a glass substrate or a quartz substrate, then a color film is adhered to the glass substrate or the quartz substrate formed with the touch control electrode with glue. In this case, the sum of the thickness of the glue, and that of a substrate of the color filter substrate is equal to the distance between the touch control electrode 1 and the display pixels. Thereby, in use, the distance between the touch control electrode 1 and the display pixels may be adjusted by adjusting the thickness of the substrate of the color filter substrate or the thickness of the glue, so that the touch control electrode on the touch screen is configured to be satisfy the condition for achieving the naked-eye 3D display.

According to an exemplary embodiment of another aspect of the present invention, there is also provided a method for manufacturing a touch screen, comprising a step of forming a pattern of a touch control electrode. For example, a layer of metal film is firstly formed, then the pattern of the touch control electrode 1 is formed by one patterning process.

In an exemplary embodiment of the present invention, the touch control electrode comprises a first electrode unit 101 and a second electrode unit 102. The first and second electrode units 101 and 102 each has a strip body and a teeth-like structure perpendicular to the strip body and extending from a side of the strip body. The teeth-like structures of the first and second electrode units 101 and 102 are arranged to face each other and separated from each other. The teeth-like structures of the first and second electrode units 101 and 102 are configured to shade light.

In an exemplary embodiment of the present invention, said forming a pattern of a touch control electrode comprising a step of forming a pattern of a plurality of electrode sets 10 arranged in an array, the plurality of electrode sets 10 each comprising the first electrode unit 101 and the second electrode unit 102.

In an exemplary embodiment of the present invention, the method further comprises steps of:

S11: forming a pattern of a first bridge unit on a substrate;

For example, a layer of metal film is firstly formed on the substrate 3, and then the first bridge units 21 are formed by one patterning process. The first bridge unit 21 is configured to connect one pair of diagonally adjacent electrode sets of four adjacent electrode sets 10.

S12: forming an insulation layer on the substrate on which the pattern of the first bridge unit is formed;

It is noted that since the insulation layer 4 is used to electrically isolate the first bridge unit 21 from the second bridge unit 22, the insulation layer 4 may be formed only at a position where the second bridge unit 22 crosses over the first bridge unit 21 or formed to wholly cover the side of the substrate 3. In the case where the insulation layer 4 is formed to wholly cover the side of the substrate 3, the step S11 comprises forming vias, for electrically connecting the second bridge units 22 and the electrode sets 10, in the insulation layer 4 by one patterning process.

S13: forming a pattern of a second bridge unit on the substrate on which the insulation layer is formed; and In an exemplary embodiment, the second bridge unit 22 is configured to electrically connect the other pair of diagonally adjacent electrode sets of four adjacent electrode sets 10, and the second bridge unit 22 crosses over the first bridge unit 21.

In an exemplary embodiment, a layer of metal film is formed on the substrate 3 on which the insulation layer 4 is formed, and then the second bridge units 22 are formed by one patterning process.

S14: forming a protection layer on the substrate on which the pattern of the second bridge unit is formed.

In an exemplary embodiment, in order to simplify the manufacturing process, in the method for manufacturing the touch screen, the first bridge unit 21 and the electrode sets 10 connected to the first and second bridge units 21 and 22 are arranged in the same layer; or the first bridge unit 21 and the electrode sets 10 connected to the first bridge unit 21 are arranged in one layer, and the second bridge unit 22 and the electrode sets 10 connected to the second bridge unit 22 are arranged in another layer; or the second bridge unit 22 and the electrode sets 10 connected to the first and second bridge units 21 and 22 are arranged in the same layer.

Hereafter, it will describe several possible methods for manufacturing the touch screen according to exemplary embodiments of the present invention with reference to FIGS. 12-16.

Figure 12:
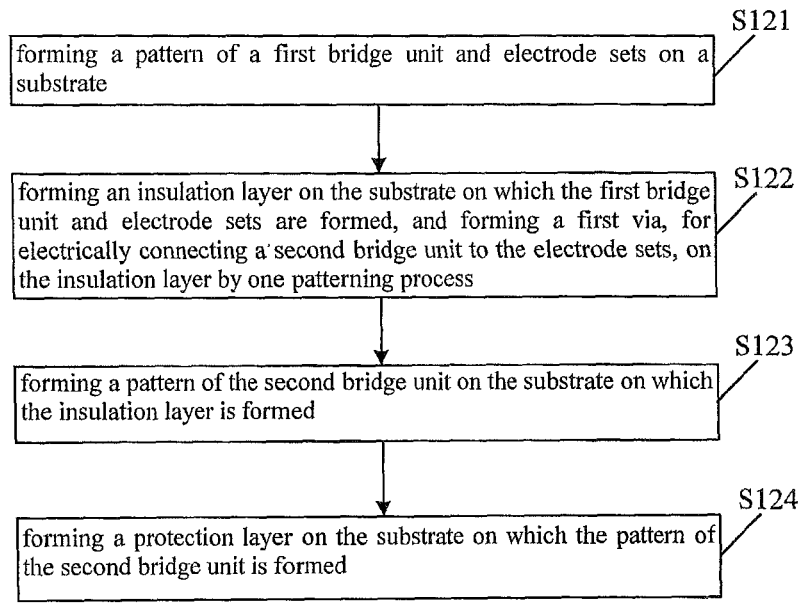
FIG. 12 is an illustrative flow chart of manufacturing the first touch screen according to an exemplary embodiment of the present invention.

As shown in FIG. 12, the first method, for example, for manufacturing the touch screen of FIGS. 2-3, comprising steps of:

S121: forming a pattern of a first bridge unit and electrode sets on a substrate;

S122: forming an insulation layer on the substrate on which the first bridge unit and electrode sets are formed, and forming a first via, for electrically connecting a second bridge unit to the electrode sets, on the insulation layer by one patterning process;

S123: forming a pattern of the second bridge unit on the substrate on which the insulation layer is formed; and S124: forming a protection layer on the substrate on which the pattern of the second bridge unit is formed.

Figure 13:
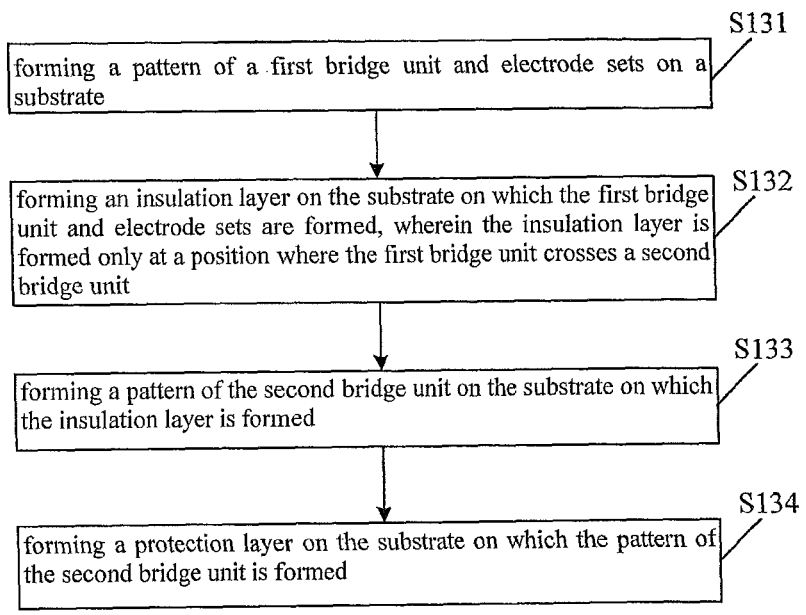
FIG. 13 is an illustrative flow chart of manufacturing the second touch screen according to an exemplary embodiment of the present invention.

As shown in FIG. 13, the second method, for example, for manufacturing the touch screen of FIGS. 4-5, comprising steps of:

S131: forming a pattern of a first bridge unit and electrode sets on a substrate;

S132: forming an insulation layer on the substrate on which the first bridge unit and electrode sets are formed, wherein the insulation layer is formed only at a position where the first bridge unit crosses a second bridge unit;

S133: forming a pattern of the second bridge unit on the substrate on which the insulation layer is formed; and S134: forming a protection layer on the substrate on which the pattern of the second bridge unit is formed.

Figure 14:
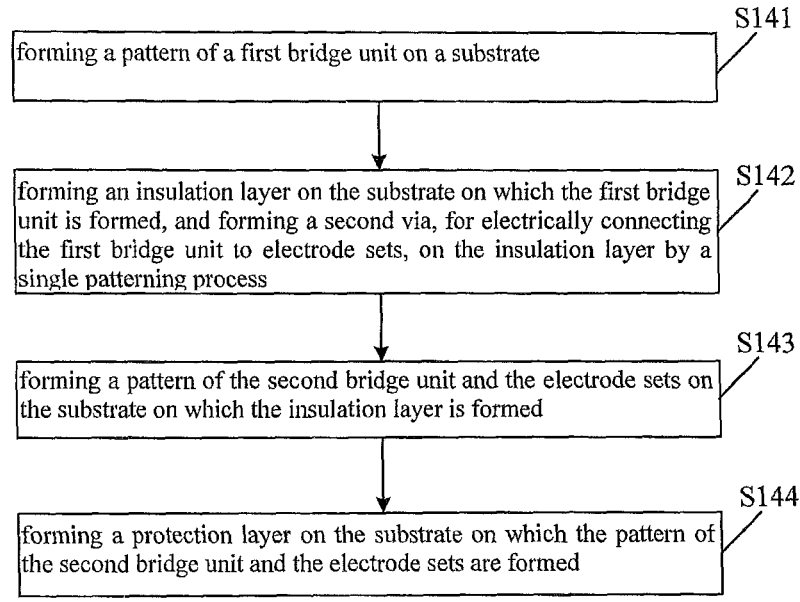
FIG. 14 is an illustrative flow chart of manufacturing the third touch screen according to an exemplary embodiment of the present invention.

As shown in FIG. 14, the third method, for example, for manufacturing the touch screen of FIGS. 6-7, comprising steps of:

S141: forming a pattern of a first bridge unit on a substrate;

S142: forming an insulation layer on the substrate on which the first bridge unit is formed, and forming a second via, for electrically connecting the first bridge unit to electrode sets, on the insulation layer by one patterning process;

S143: forming a pattern of the second bridge unit and the electrode sets on the substrate on which the insulation layer is formed; and S144: forming a protection layer on the substrate on which the pattern of the second bridge unit and the electrode sets are formed.

Figure 15:
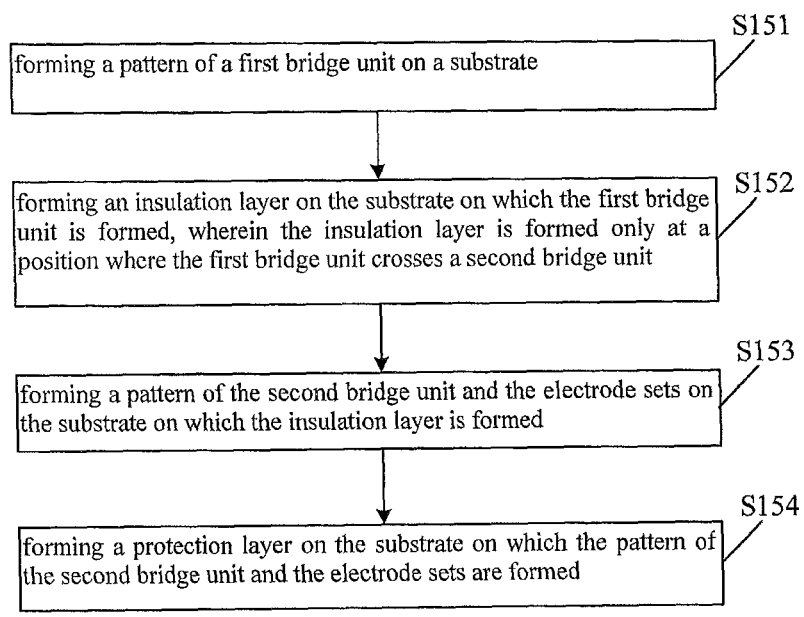
FIG. 15 is an illustrative flow chart of manufacturing the fourth touch screen according to an exemplary embodiment of the present invention.

As shown in FIG. 15, the fourth method, for example, for manufacturing the touch screen of FIGS. 8-9, comprising steps of:

S151: forming a pattern of a first bridge unit on a substrate;

S152: forming an insulation layer on the substrate on which the first bridge unit is formed, wherein the insulation layer is formed only at a position where the first bridge unit crosses a second bridge unit;

S153: forming a pattern of the second bridge unit and the electrode sets on the substrate on which the insulation layer is formed; and S154: forming a protection layer on the substrate on which the pattern of the second bridge unit and the electrode sets are formed.

Figure 16:
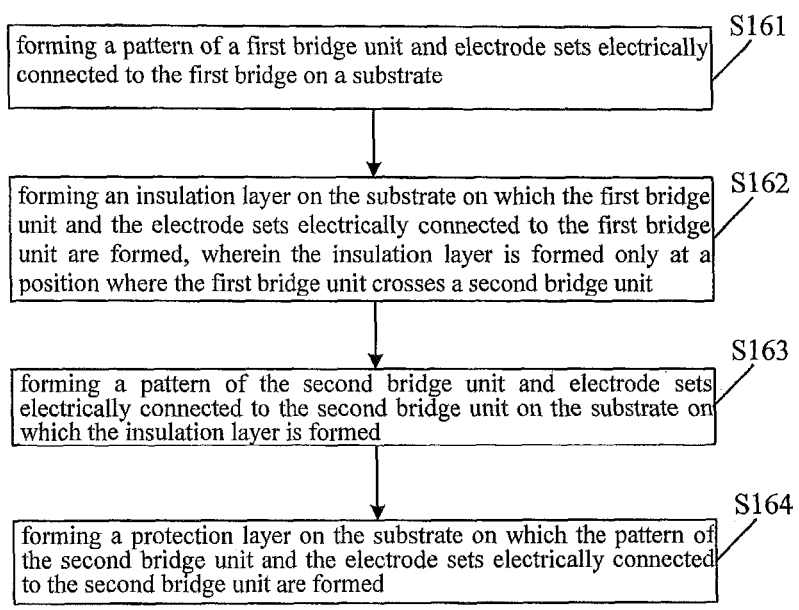
FIG. 16 is an illustrative flow chart of manufacturing the fifth touch screen according to an exemplary embodiment of the present invention.

As shown in FIG. 16, the fifth method, for example, for manufacturing the touch screen of FIGS. 10-11, comprising steps of:

S161: forming a pattern of a first bridge unit and electrode sets connected to the first bridge on a substrate;

S162: forming an insulation layer on the substrate on which the first bridge unit and the electrode sets connected to the first bridge unit are formed, wherein the insulation layer is formed only at a position where the first bridge unit crosses a second bridge unit;

S163: forming a pattern of the second bridge unit and electrode sets connected to the second bridge unit on the substrate on which the insulation layer is formed; and S164: forming a protection layer on the substrate on which the pattern of the second bridge unit and the electrode sets connected to the second bridge unit are formed.

Although several possible methods for manufacturing the touch screen have been described in the above exemplary embodiments, it is obvious for those skilled in this art to think out other possible methods for manufacturing the touch screen or variations based on the teaching of the above exemplary embodiments of the present invention. For the purpose of concise, other possible methods for manufacturing the touch screen or variations are omitted herein.

In an exemplary embodiment of the present invention, the method for manufacturing the touch screen may further comprise step(s) of forming other structure(s), and the description thereof is also omitted herein.

In the above various embodiments of the present invention, there is provided the method for manufacturing the touch screen. The method comprises forming the pattern of the touch control electrode. The touch control electrode comprises a first electrode unit and a second electrode unit. The first and second electrode units each has a strip body and a teeth-like structure perpendicular to the strip body and extending from a side of the strip body. The teeth-like structures of the first and second electrode units are arranged to face each other and spaced away from each other. The teeth-like structures of the first and second electrode units are configured to shade light. Thereby, in the embodiments of the present invention, the touch control electrode not only functions as an electrode for conducting electricity, but also as a grating for shading light to achieve the naked-eye 3D display effect. As a result, in the embodiments of the present invention, it does not need to specially produce an individual grating on the touch screen, avoiding the position error of manufacturing the individual grating and improving the 3D display effect. It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A touch screen having a touch control electrode, the touch control electrode comprising:
   a first electrode unit having a first strip body and a first teeth-like structure perpendicular to the first strip body and extending from a side of the first strip body; and
   a second electrode unit having a second strip body and a second teeth-like structure perpendicular to the second strip body and extending from a side of the second strip body,
   wherein the first teeth-like structure of the first electrode unit and the second teeth-like structure of the second electrode unit are arranged to face each other and spaced away from each other,
   wherein the first strip body and the second strip body extend in a first direction, the first teeth-like structure and the second teeth-like structure extend in a second direction perpendicular to the first direction,
   wherein the first teeth-like structure comprises a plurality of first teeth arranged in the first direction and spaced away from each other, the second teeth-like structure comprises a plurality of second teeth arranged in the first direction and spaced away from each other,
   wherein the plurality of first teeth of the first electrode unit and the plurality of second teeth of the second electrode unit are arranged to be staggered with each other,
   wherein the first teeth and the second teeth are configured to prohibit a light from transmitting there through, and there are spaces between the first teeth and the second teeth to allow the light to transmit there through, so that the first teeth-like structure of the first electrode unit and the second teeth-like structure of the second electrode unit are configured as a grating for shading light.

2. The touch screen according to claim 1,
   wherein the touch control electrode is made of metal so as to function as an electrode for conducting electricity and the grating for shading light, and
   wherein the grating for shading light is configured to achieve naked-eye 3D display of the touch screen.

3. The touch screen according to claim 1,
   wherein the touch control electrode comprises a plurality of electrode sets arranged in an array, and wherein each of the plurality of electrode sets comprise the first electrode unit and the second electrode unit.

4. The touch screen according to claim 3,
wherein diagonally adjacent electrode sets are connected by a bridge, and
wherein the bridge comprises a first bridge unit and a second bridge unit crossing each other, and the second bridge unit is disposed over the first bridge.

5. The touch screen according to claim 4,
wherein the first bridge unit is configured to electrically connect one pair of diagonally adjacent electrode sets of four adjacent electrode sets; and
wherein the second bridge unit is configured to electrically connect the other pair of diagonally adjacent electrode sets of four adjacent electrode sets.

6. The touch screen according to claim 4,
wherein the first bridge unit and the electrode sets electrically connected to the first and second bridge units are arranged in the same layer; or
wherein the first bridge unit and the electrode sets electrically connected to the first bridge unit are arranged in the same layer, and the second bridge unit and the electrode sets electrically connected to the second bridge unit are arranged in the same layer; or
wherein the second bridge unit and the electrode sets electrically connected to the first and second bridge units are arranged in the same layer.

7. The touch screen according to claim 6, further comprising a substrate, an insulation layer and a protection layer,
wherein the first bridge unit, the insulation layer, the second bridge unit and the protection layer are formed on a side of the substrate in this order.

8. The touch screen according to claim 7,
wherein the insulation layer is located only at a position where the first bridge unit and the second bridge unit cross each other.

9. The touch screen according to claim 7,
wherein the insulation layer covers the whole substrate, and
wherein vias are formed in the insulation layer to electrically connect the first and second bridge units and the electrode sets.

10. A 3D display apparatus comprising a touch screen according to claim 1.

11. The 3D display apparatus according to claim 10,
wherein the touch control electrode is provided on one side of a substrate of the touch screen, and
wherein a black matrix and a color filter layer are provided on the other side of the substrate of the touch screen.

12. A method for manufacturing a touch screen, comprising a step of forming a pattern of a touch control electrode,
wherein the touch control electrode comprises a first electrode unit and a second electrode unit, the first electrode unit having a first strip body and a first teeth-like structure perpendicular to the first strip body and extending from a side of the first strip body, and the second electrode unit having a second strip body and a second teeth-like structure perpendicular to the second strip body and extending from a side of the second strip body,
wherein the first teeth-like structure of the first electrode unit and the second teeth-like structure of the second electrode unit are arranged to face each other and spaced away from each other,
wherein the first strip body and the second strip body extend in a first direction, the first teeth-like structure and the second teeth-like structure extend in a second direction perpendicular to the first direction,
wherein the first teeth-like structure comprises a plurality of first teeth arranged in the first direction and spaced away from each other, the second teeth-like structure comprises a plurality of second teeth arranged in the direct direction and spaced away from each other,
wherein the plurality of first teeth of the first electrode unit and the plurality of second teeth of the second electrode unit are arranged to be staggered with each other,
wherein the first teeth and the second teeth are configured to prohibit a light from transmitting there through, and there are spaces between the first teeth and the second teeth to allow the light to transmit there through, so that the first teeth-like structure of the first electrode unit and the second teeth-like structure of the second electrode unit are configured as a grating for shading light.

13. The method according to claim 12, wherein the step of forming a pattern of a touch control electrode comprises a step of:
forming a pattern of a plurality of electrode sets arranged in an array, wherein the plurality of electrode sets each comprising the first electrode unit and the second electrode unit.

14. The method according to claim 13, further comprising steps of:
forming a pattern of a first bridge unit on a substrate, wherein the first bridge unit is configured to electrically connect one pair of diagonally adjacent electrode sets of four adjacent electrode sets;
forming an insulation layer on the substrate on which the pattern of the first bridge unit is formed;
forming a pattern of a second bridge unit on the substrate on which the insulation layer is formed, wherein the second bridge unit is configured to electrically connect the other pair of diagonally adjacent electrode sets of four adjacent electrode sets, the second bridge unit and the first bridge unit crossing each other; and
forming a protection layer on the substrate on which the pattern of the second bridge unit is formed.

15. The method according to claim 14,
wherein the insulation layer is located only at a position where the first bridge unit and the second bridge unit cross each other.

16. The method according to claim 15,
wherein the insulation layer covers the whole substrate, and
wherein the step of forming an insulation layer on the substrate on which the pattern of the first bridge unit is formed comprising a step of forming vias in the insulation layer to electrically connect the first and second bridge units and the electrode sets by one patterning process.

17. The method according to claim 15,
wherein the first bridge unit and the electrode sets electrically connected to the first and second bridge units are arranged in the same layer; or
wherein the first bridge unit and the electrode sets electrically connected to the first bridge unit are arranged in the same layer, and the second bridge unit and the electrode sets electrically connected to the second bridge unit are arranged in the same layer; or
wherein the second bridge unit and the electrode sets electrically connected to the first and second bridge units are arranged in the same layer.

18. The method according to claim 16,
wherein the first bridge unit and the electrode sets electrically connected to the first and second bridge units are arranged in the same layer; or wherein the first bridge unit and the electrode sets electrically connected to the first bridge unit are arranged in the same layer, and the second bridge unit and the electrode sets electrically connected to the second bridge unit are arranged in the same layer; or wherein the second bridge unit and the electrode sets electrically connected to the first and second bridge units are arranged in the same layer.

* * * * *